United States Patent [19]
Ims

[11] 3,751,979
[45] Aug. 14, 1973

[54] SPEED MEASUREMENT SYSTEM

[75] Inventor: John Robert Ims, Portsmouth, R.I.

[73] Assignee: Raytheon Company, Lexington, Mass.

[22] Filed: Nov. 17, 1971

[21] Appl. No.: 199,486

[52] U.S. Cl. .............................. 73/194 A, 73/181
[51] Int. Cl. ...................... G01p 5/00, G01c 21/10
[58] Field of Search ............. 73/181, 194 A, 290 V

[56] References Cited
UNITED STATES PATENTS

| | | | |
|---|---|---|---|
| 3,209,591 | 10/1965 | Lester et al. ........................ | 73/181 |
| 3,420,102 | 1/1969 | Brown ............................ | 73/194 A |
| 3,678,731 | 7/1972 | Wells et al. ...................... | 73/194 A |

*Primary Examiner*—Donald O. Woodiel
*Attorney*—Milton D. Bartlett et al.

[57] ABSTRACT

A speed measurement system utilizing a plurality of radiators coupled to a medium for transmitting radiant energy signals within the medium between the radiators in a manner wherein the frequency of the radiant energy is adjusted to retain a predetermined number of wavelengths between a transmitting radiator and a receiving radiator independently of the speed of the medium relative to the radiators. In one embodiment of the invention sonic signals are transmitted through a fluid medium which is moving relative to the radiators. A phase locked loop is interconnected between a pair of radiators by means of a switching arrangement which permits alternative transmissions of sonic energy in the direction of fluid movement (downstream) and in the direction opposite to the fluid movement (upstream). Phase lock is obtained when the frequency of the phase locked loop is such that the predetermined number of wavelengths of the sonic transmission is present. The speed of the fluid medium as well as the speed of sound propagation within the fluid medium are obtained by arithmetic combinations of the values of the upstream and downstream frequencies.

12 Claims, 10 Drawing Figures

(GRAPH 1) LINE 78

(GRAPH 2) LINE 146

(GRAPH 3) SWITCH 88 UP STREAM & DOWN STREAM (GRAPH 4) COUNTER 156 COUNTS

(GRAPH 5) COUNTER 156 RESET (GRAPH 6) LINE 168 STROBE

TIME ⟶

SPEED MEASUREMENT SYSTEM

BACKGROUND OF THE INVENTION

Various forms of systems for the measurement of the speed of flowing liquids have been developed in the past. Some of these systems use two pairs of transducers for transmitting sound in the liquid, one pair being utilized for the transmission of sound through the liquid in the direction of its motion (downstream) while the second pair of transducers is utilized to transmit sound in a direction opposite to the velocity of the liquid (upstream). Such systems have utilized pulses of sonic energy transmitted in both the upstream and downstream directions with the difference in the transmission times of the upstream and downstream transmissions being utilized to compute the speed of the moving liquid. A problem arises in the use of such equipment in that it is often unduly complex, and furthermore, may not have sufficient measurement accuracy. As an example of the source of inaccuracy in such measurements, the pulses of energy utilized in the sonic transmission may well become distorted due to the frequency dispersive characteristic of the fluid with the result that the leading edge of these pulses, so critical in the measurements, becomes poorly defined with a consequent reduction in the measurement accuracy.

SUMMARY OF THE INVENTION

In accordance with the present invention there is provided a speed measurement system which overcomes the aforementioned dificiencies in the speed measurement capabilities of the prior art devices and which furthermore provides for a more convenient and rapid measurement of both the speed of a fluid medium as well as the speed of propagation of radiant energy within the fluid medium. The invention may also be utilized for providing the speed of propagation of radiant energy within a solid medium. The invention comprises a plurality of radiators coupled to a medium for transmitting radiant energy signals into the medium in at least two directions, the radiators being positioned for receiving the signals after they have traversed predetermined distances within the medium. The invention further comprises means coupled to the radiators for adjusting the frequencies of the radiant energy signals to retain predetermined numbers of wavelengths of the radiant energy signals along the respective paths traversed by the signals. While the invention may utilize transmissions of sonic, light or electromagnetic energies, the preferred embodiment of the invention utilizes sonic signals which are alternately transmitted in the downstream and the upstream directions through a moving fluid with the wavelengths of the sound transmissions being adjusted both during the upstream and during the downstream transmissions by means of a phase locked loop switchably connected to the pair of radiators. The radiators may be, by way of example, piezoelectric crystals which serve as transducers between electrical signals and acoustic signals. Phase lock is obtained when the frequency of the phase locked loop is such that the predetermined number of wavelengths is present in the radiant energy transmission; one frequency being provided in the downstream transmission and a second frequency being provided for the upstream transmission. The value of each frequency is obtained by means such as a digital cycle counter which counts cycles for predetermined intervals of time during both the upstream and the downstream directions, this counter also serving as an arithmetic device to provide the sum of the two frequencies which is proportional to the speed of propagation of the sound within the fluid medium as well as the difference of the two frequencies which is proportional to the speed of movement of the fluid medium itself.

BRIEF DESCRIPTION OF THE DRAWINGS

The aforementioned features and other aspects of the invention are explained in the following description taken in connection with the accompanying drawings wherein.

DESCRIPTION OF THE PREFERRED EMBODIMENT

Figure 1:
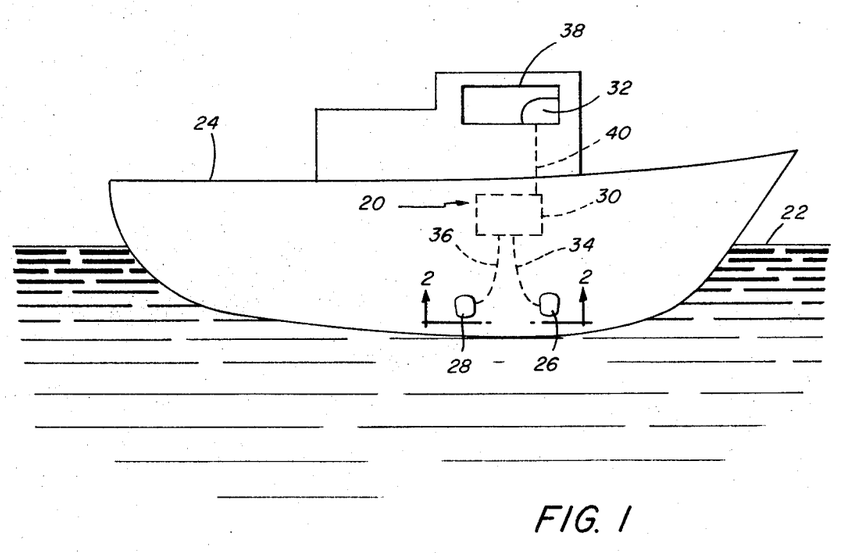
FIG. 1 shows a ship sailing on the ocean and being provided with the fluid measuring system of the invention with transducers mounted on the hull of the ship for measuring the speed of the ship relative to the ocean.

Referring now to FIG. 1, there is shown a system 20 in accordance with the invention for the measurement of the speed of the water of the ocean 22 relative to a ship 24 sailing along the ocean 22. The system 20 comprises a pair of transducer assemblies 26 and 28, a signal processor 30 and a display 32. The transducer assemblies 26 and 28 are mounted on the hull of the ship 24 in contact with the waters of the ocean 22 for transmitting radiant energy, herein sonic energy, therebetween and are connected to the signal processor via electrical cables 34 and 36. The display 32 is partially seen through a window 38 of the cabin of the ship 24 and is connected via an electrical cable 40 to the signal processor 30. The signal processor 30 may be located at any convenient portion in the interior of the ship, and as seen in FIG. 1, has been positioned within the hull of the ship 24.

Figure 2:
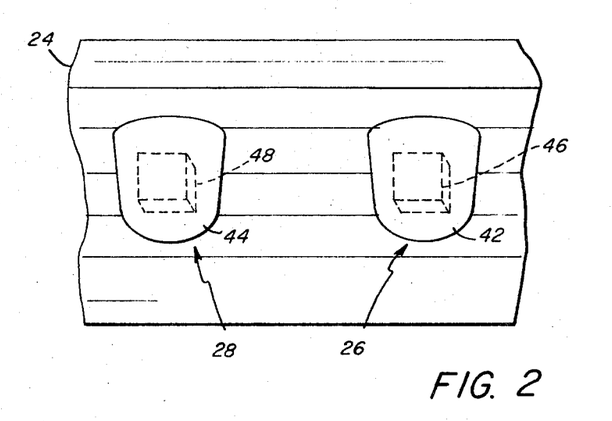
FIG. 2 shows an enlarged view of a fluid guiding structure and transducer assembly mounted on the hull of the ship of FIG. 1.

Referring now to FIG. 2, there is shown an enlarged view of the transducer assemblies 26 and 28 of FIG. 1. The transducer assembly 26 is positioned forward of the transducer assembly 28, and each comprises housings respectively 42 and 44 and transducers respectively 46 and 48 which are shown in dotted lines enclosed by the housings 42 and 44. The housings 42 and 44 are tightly fitted to the hull of the ship 24 to exclude water from the transducers 46 and 48, and are furthermore provided with a well-known curved surface for guiding the ocean water in a laminar flow past the housings 42 and 44. The transducers 46 and 48 are in physical contact with the housings 42 and 44 so that sonic vibrations provided by these transducers are coupled via the housings 42 and 44 into the ocean water, one housing being at a point of entry of sonic energy into the water and the other housing being at a point of exit of the sonic energy from the water, depending on the direction of propagation of the energy.

Figure 3:
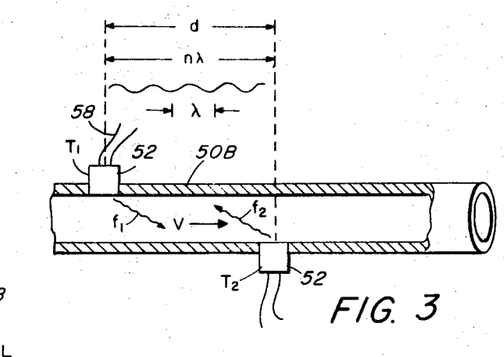
FIG. 3 shows a pipeline provided with a plurality of transducers for measuring the speed of fluid within the pipeline.

Referring now to FIG. 3, there are seen two sections of a pipe 50A and 50B which are seen in a partially cutaway view to expose a longitudinal sectional view of transducers mounted within the pipes 50A and 50B. In pipe section 50A there are mounted two transducers 52 of a well-known design, each of which comprises a piezoelectric crystal 54 and electrodes 56 affixed to the piezoelectric crystal 54 whereby electrical signals conducted by wires 58 are applied to the piezoelectric crystal 54 for converting the electrical energy to sonic energy. The wires 58 connect with a suitable signal processor such as the signal processor 30 which has been mentioned above with reference to FIG. 1 and will be described in detail with reference to FIGS. 4 and 5. The transducers 52 are mounted within a housing 60 which opens upon the interior of the pipe 50A at an oblique angle such that a fluid within the pipe 50A can enter the housing and reach a face of the crystal 54. Encapsulation of the crystal 54, not seen in the figures, is provided to protect the crystal 54 from the fluid within the pipe 50A and also serves in a well-known manner to acoustically insulate the crystal 54 from the housing 60 as well as to facilitate an impedance match between the acoustic impedance of the crystal to that of the fluid within the pipe section 50A. In the pipe section 50A the fluid which may be a compressed gas is presumed to be flowing at a speed at which the Reynolds number of the fluid is greater than 4000 so that there is turbulence in the medium; thus any turbulence introduced by the opening of the housing 60 into the pipe section 50A introduces substantially no effect on the measurement of the speed of the fluid.

In pipe section 50B the transducers 52 are indicated diagrammatically and are shown mounted flush with the interior walls of the pipe 50B to permit a laminar flow of fluid within the pipe as would be the case if the fluid is, for example, presumed to be a slowly moving viscous oil. In both the sections of pipes 50A and 50B, the transducers 52 are mounted on opposite sides of the pipes so that sonic energy travelling from one transducer to the other passes through layers of the fluid at the center of the pipe as well as near the walls of the pipe. This is advantageous, particularly in the case of the laminar flow of pipe section 50B wherein, as is well known, the flow of fluid along the central portion of the pipe is greater than that along the walls of the pipe. Thus, the positioning of the transducers 52 on opposite sides of the pipe sections 50A and 50B permits a measurement of fluid speed which accounts for both the rapidly and slowly moving portions of the fluid.

The measurement of the fluid speed, indicated by an arrow labeled V in FIG. 3, is based on the transmission of sonic energy in both the direction of the fluid, the downstream direction, and in a direction opposite the flow of fluid, the upstream direction. Thus, for example, a pair of transducers mounted on a pipe, as in FIG. 3, may be utilized to transmit sound in the upstream direction with one transducer being utilized as the transmitter while the second is utilized as the receiver, a second pair of transducers being similarly used for transmission of sound in the downstream direction. Or, alternatively, a single pair of transducers may be utilized to transmit alternately in the upstream and the downstream directions.

The mathematical basis for the fluid speed measurements may be established by reference to the pipe section 50B of FIG. 3. The transducers 52 have been further identified by the legends $T_1$ and $T_2$ and will sometimes be referred to hereinafter as simply $T_1$ and $T_2$. Here it is presumed that $T_1$ and $T_2$ transmit alternately in the downstream and upstream directions, with $T_1$ serving as the downstream transmitter while $T_2$ serves as the downstream receiver during downstream transmission, and $T_1$ serving as the upstream receiver while $T_2$ serves as the upstream transmitter during upstream transmission. In order to perform the dual functions of transmission and reception, the transducers $T_1$ and $T_2$ may be connected to a suitable signal processor such as the signal processor 30 in a manner to be described with reference to FIG. 4.

In the following analysis it will be presumed that the inner diameter of the pipe section 50B is small relative to the spacing, $d$, between $T_1$ and $T_2$ so that sonic transmissions between $T_1$ and $T_2$ may be regarded as travelling along a line substantially parallel to the axis of the pipe section 50B. When $T_1$ is transmitting, it transmits sound at a carrier frequency $f_1$ and when $T_2$ is transmitting, it transmits sound at a carrier frequency $f_2$. When the fluid is stationary ($V = 0$), as will be seen, $f_1 = f_2$; however, when the fluid is in motion, $f_1$ differs from $f_2$ in a manner to be described.

It is apparent at the outset that the propagation time of sonic energy between $T_1$ and $T_2$ depends on the distance $d$ as well as the speed of sound $C$ in the medium of the fluid itself. When the fluid is at rest, a sonic frequency $f$ may be selected such that there are an integral number of wavelengths $\lambda$, where $\lambda = C/f$, between $T_1$ and $T_2$; that is, $d = n\lambda$ where $n$ is the number of wavelengths.

When the fluid is flowing with a speed V, the aforementioned relationship between $\lambda$ and $f$ is altered such that the wavelength of sound propagating in the upstream direction, $\lambda_U$ may differ from the wavelength of sound propagating in the downstream direction $\lambda_D$. Thus, $$\lambda_D = C + V/f_1 \qquad (1)$$

and $$\lambda_U = C - V/f_2 \qquad (2)$$

In order to accomplish the fluid speed measurement, the frequencies $f_1$ and $f_2$ are adjusted (by the signal processor 30 as will be described) so that $\lambda_U = \lambda_D$, both being equal to the distance $d$ divided by an integral number of wavelengths, namely, $$\lambda_U = \lambda_D = d/n \quad (3)$$

To provide this equality of upstream and downstream wavelengths, the appropriate values of $f_1$ and $f_2$ are readily obtained from the preceding equations to give $$f_1 = (C+V)(n/d) \quad (4)$$

$$f_2 = (C-V)(n/d) \quad (5)$$

The fluid speed, V, and the speed of propagation within the fluid, C, are now readily obtained by adding and subtracting the two equations to give $$V = (d/2n)(f_1-f_2) \quad (6)$$

$$C = (d/2n)(f_1+f_2) \quad (7)$$

Thus, it is seen that the fluid speed V can be obtained without any prior knowledge of the value of the propagation speed C, and the propagation speed C can be obtained without any prior knowledge of the fluid speed V. This analysis, which was developed for the case of the pipe section 50B of FIG. 3, applies equally well for the system 20 of FIG. 1 utilizing the spaced apart transducer assemblies 26 and 28 which are suitably spaced to provide an integral number of wavelengths between the transducer assemblies 26 and 28. It is also apparent by reference to the mathematics of the preceding equations, that the same relationship holds if a nonintegral but equal number of wavelengths are utilized in both the upstream and downstream sonic transmissions; however, as will become apparent, an integral number of wavelengths is more simply implemented. The implementation of the system 20 of FIG. 1 utilizing the preceding mathematical analysis will now be demonstrated by reference to the system block diagram of FIG. 4.

Figure 4:
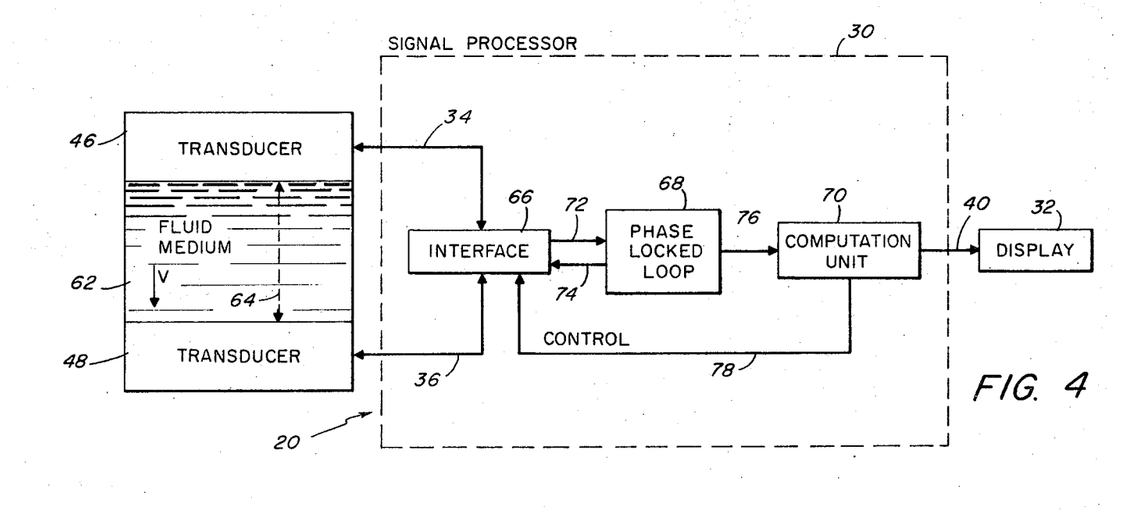
FIG. 4 is a block diagram of the fluid measuring system of the invention showing a pair of transducers, a phase locked loop, switching (or gating) circuitry interconnecting the transducers with the phase locked loops, and a digital computation unit for extracting speed data.

Referring now to FIG. 4, there is seen a block diagram of the system 20 including the transducers 46 and 48, the signal processor 30 and the display 32 which were seen earlier in FIGS. 1 and 2. A fluid medium 62 is seen located between the transducers 46 and 48 through which radiant energy, indicated by dashed line 64, propagates between the two transducers 46 and 48. It is seen that the fluid medium 62 may represent the waters of the ocean 22 of FIG. 1, or alternatively, it is seen that the fluid medium 62 may represent the fluid within the sections of pipe 50A and 50B of FIG. 3, in which case the transducers 52 of FIG. 3 would be substituted for the transducers 46 and 48 of FIG. 4. The housings 42 and 44 of FIG. 2 have been deleted in FIG. 4 to facilitate the explanation of the interconnection between the transducers 46 and 48 and the signal processor 30.

The transducers 46 and 48 are interconnected with the signal processor 30 via electrical cables 34 and 36, seen also in FIG. 1. The signal processor 30 is interconnected with the display 32 via electrical cable 40, seen also in FIG. 1. The electrical cables 34 and 36 comprise typically a pair of wires such as the wires 58 of FIG. 3.

The signal processor 30 comprises an interface unit 66, a phase locked loop 68 hereinafter sometimes referred to as PLL 68, and a computation unit 70. The PLL 68 receives an input signal on line 72 and provides an output signal on line 74. The interface unit 66 interconnects the signals on lines 72 and 74 via an internal switching arrangement, to be described hereinafter with reference to FIG. 5, with each of the transducers 46 and 48. The fluid of the fluid medium 62 moves in the direction of the arrow labelled V between the transducers 46 and 48 so that transmissions of radiant energy, herein sonic energy, from the transducer 46 are in the downstream direction while transmissions of sonic energy from the transducer 48 are in the upstream direction. The interface unit 66 comprises means for amplifying the signals on line 74 to provide a suitable power level for operating the transducers 46 and 48. Similarly, the interface unit 66 provides amplification and filtering of signals received from the transducers 46 and 48 along lines 34 and 36 for providing adequate signal strength to signals presented on line 72 to PLL 68.

The PLL 68 also provides a signal along line 76 which serves as a clock signal for driving the computation unit 70. The computation unit 70, as will be described hereinafter, counts the pulses of the signal on line 76, which pulses have a repetition frequency proportional to the frequency of the PLL 68. This counting is done during a predetermined interval (to be described hereinafter) so that the resulting count represents the frequency of the PLL 68. A control signal on line 78 is transmitted from the computation unit 70 to the interface unit 66 to accomplish a switching from a downstream transmission to an upstream transmission (and vice versa) so that the computation unit 70 is responsive to the frequencies utilized in both the upstream and the downstream transmissions. The computation unit 70 provides a numerical output related to the sum or difference of these frequencies, in accordance with Equations 3 and 4, to provide respectively the speed of propagation C within the fluid medium, or alternatively, the speed V of the fluid medium; this numerical output is transmitted along electrical cable 40 to the display 32.

Figure 5:
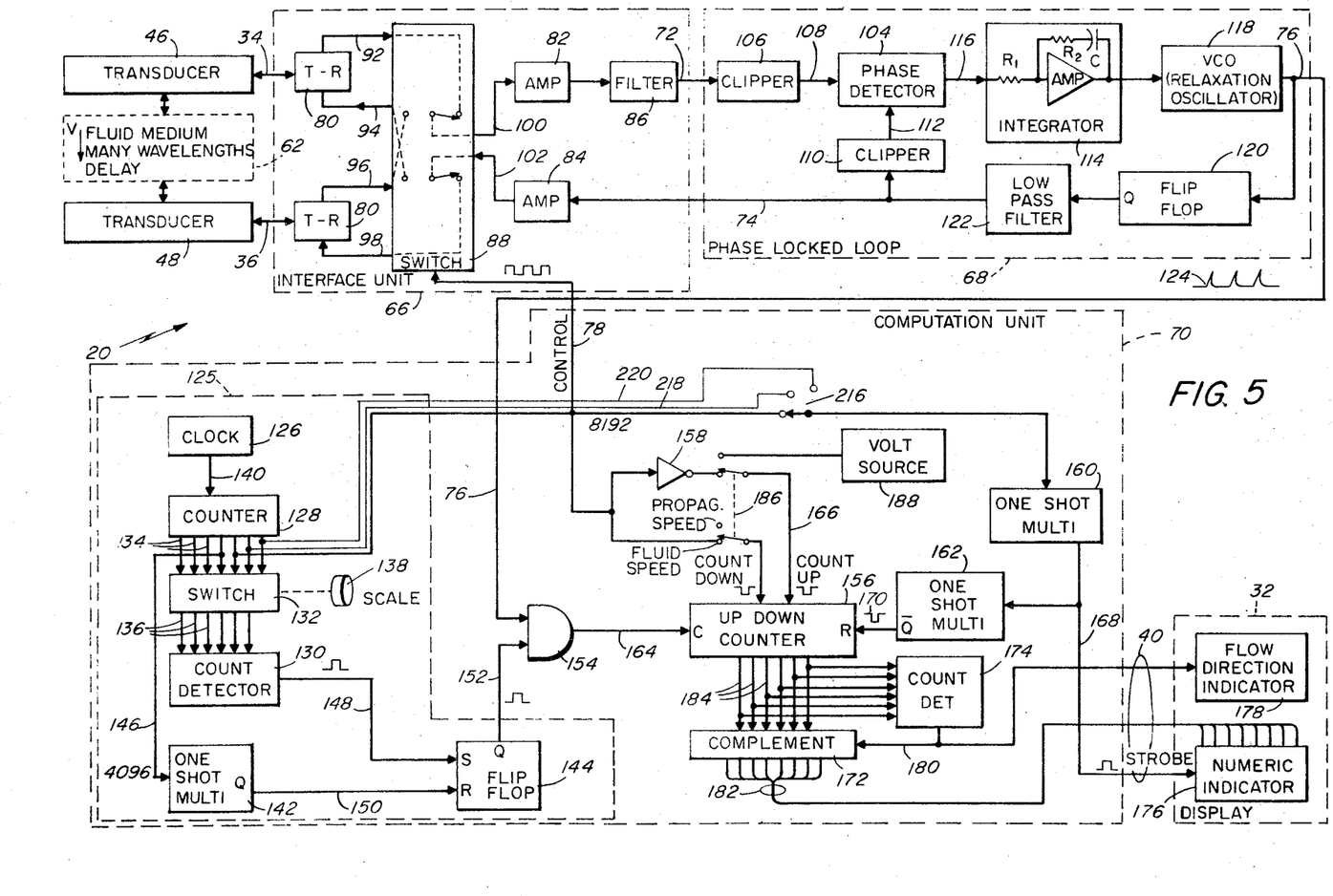
FIG. 5 is a detailed block diagram of the system of FIG. 4.

Referring now to FIG. 5, there is shown a more detailed block diagram of the system 20 of FIGS. 1 and 4. The transducers 46 and 48, the interface unit 66, the PLL 68, the computation unit 70 and the display 32 are seen in both FIGS. 4 and 5. Also, the interconnections between these units are seen in both FIGS. 4 and 5.

As seen in FIG. 5, the interface unit 66 comprises a pair of transmit-receive circuits 80 each of which s hereinafter referred to as T-R 80, amplifiers 82 and 84, a filter 86, and in this embodiment, a double-pole-double-throw switch (or relay) 88 responsive to the control signal on line 78. In an alternative embodiment, the switch 88 is replaced by a gating circuit 90 of FIG. 6, to be described hereinafter, which is functionally equivalent to the switch 88 and is responsive to the control signal on line 78. T-R 80 is a well-known circuit which, by way of example in the situation where sonic energy is propagated in the fluid medium 62, may be a resistor-diode circuit which portects the front end of the amplifier 82 from relatively large amplitude signals emanating from the amplifier 84 while permitting the passage of lower amplitude signals received from either the transducer 46 or the transducer 48. In the preferred embodiment, the amplifier 84 provides 100 milliwatts of power. The T-R circuits 80 are interconnected via the lines 92, 94, 96 and 98 to the switch 88 such that lines 94 and 96 are interconnected respectively with lines 102 and 100 for downstream transmissions, the lines 92 and 98 being connected respectively to lines 100 and 102 for upstream transmissions.

thus, for example, during an upstream transmission, a signal received by the transducer 46 passes through T-R 80 and thence along 92 through switch 88 and along line 100 to the amplifier 82. The signal on line 100 is then amplified and filtered by the amplifier 82 and filter 86 and appears on line 72 at the input to the PLL 68. The filter 86 has a bandwidth substantially larger than that of the PLL 68 so as to introduce negligible phase shift to received signals. The filter 86 is useful in excluding noise outside the bandwidth of signals received on line 100. The amplifier 82 amplifies the signals on line 100 to a sufficient amplitude to be processed by the PLL 68. And also during the upstream transmission, signals from the output of the PLL 68 on line 74 are amplified by amplifier 84 to a suitable level for driving the transducer 48 and is then passed along line 102 and thence via switch 88 and line 98 through T-R 80 and electrical cable 36 to the transducer 48.

Countinuing with FIG. 5, the PLL 68 comprises a phase detector 104, a clipper 106 connecting to the signal input port of the phase detector 104 on line 108, a clipper 110 connecting to the reference input port of the phase detector 104 on line 112, an integrator 114 connected to the output port of the phase detector 104 on line 116, a voltage controlled oscillator which will be referred to hereinafter as VCO 118 and is connected to the output of the integrator 114, a flip-flop 120 connecting to the output of the VCO 118, and a low-pass filter 122 interconnecting the flip-flop 120 and the clipper 110.

The phase detector 104 is preferably of a digital form which accepts square wave signals on lines 108 and 112. The phase detector 104 compares the phases of the two square wave signals and provides an output signal on line 116 which is a rectangular waveform having a duty factor proportional to the difference in phase between the input signal on line 108 and the reference signal on line 112. The square wave signal on line 108 is obtained by clipping the sinusoidal signal on line 72 by means of the clipper 106 which may be any one of well-known clipping circuits, such as those employing diode limiters or overdriven transistor amplifier stages. In particular, it is desirable that the clipper 106, as well as the clipper 110, should introduce no more than a negligible amount of phase shift to the signals appearing respectively on lines 72 and 74. The clipper 110 is similarly a well-known circuit and may utilize the same type circuit as is used for the clipper 106. Digital phase detectors are well-known, and the phase detector 104 may utilize a circuit such as the Motorola device No. MC4344L, which comprises NAND gates coupled in flip-flop arrangements and responsive to the negative transitions in the square wave pulse trains on lines 108 and 112 to provide the aforementioned output rectangular waveform having a duty cycle proportional to the relative temporal occurrences of the respective negative transitions in the signals on lines 108 and 112.

The integrator 114 may be of a well-known form utilizing an operational amplifier with capacitive feedback such that the output voltage of the integrator 114 increases at a rate proportional to the duty factor of the rectangular waveform signal on line 116. As is well known, frequency shaping circuitry may be employed with the operational amplifier by use of suitable resistor-capacitor coupling with respect to the input and output terminals of this operational amplifier, such circuitry being shown by resistors $R_1$ and $R_2$ and capacitor C. This frequency shaping is useful in providing the desired loop bandwidth and stability of the phase locked loop 68. The transfer function, namely, the ratio of the output voltage of the integrator 114 to its input voltage in Laplace transform notation is $(R_2CS+1)/(R_1CS)$ where S is the complex frequency and the time constants $(R_2C)$ and $(R_1C)$ are much larger than the delay of the fluid medium 62, preferably by at least an order of magnitude (factor of 10). This ensures that the phase shift and delay introduced by the fluid medium 62 do not impair the loop stability.

The VCO 118 is preferably a relaxation oscillator of well-known design in which the frequency of oscillation varies substantially linearly with the magnitude of voltage applied to the VCO 118 by the integrator 114. The VCO 118 provides a succession of relatively narrow pulses, indicated by numeral 124 in the figure, on line 76.

The flip-flop 120 and the low-pass filter 122 are each of well-known design. The flip-flop 120 accepts the pulses 124 at its toggle input with the result that the Q output changes state successively in response to successive pulses 124 on line 76. Thus, there appears at the Q output of the flip-flop 120 a square wave signal having a pulse repetition frequency equal to one-half that of the pulse repetition frequency of the pulses 124; thus, the flip-flop 120 acts as a frequency divider. The low-pass filter 122 is simply an operational amplifier with a band-pass frequency characteristic having a high frequency roll-off which tends to round off the corners of the square wave at terminal Q of the flip-flop 120. The bandwidth of the filter 122 is approximately twice the fundamental frequency of this square wave signal so as to attenuate the odd numbered Fourier frequency components of which it is comprised without introducing any significant phase shift to the fundamental component or output of the filter 122. The output signal of the low-pass filter 122 is substantially sinusoidal and is coupled via line 74 to the amplifier 84 and also to the clipper 110.

In operation, therefore, the PLL 68 generates a sinusoidal signal on line 74 which is then amplified by amplifier 84 and transmitted via the fluid medium 62 to appear on line 100. The fluid medium 62 introduces a delay between the signals appearing on lines 102 and 100. Thus, the signals appearing on lines 108 and 112 are substantially identical except for a phase shift due to the temporal delay in propagation through the fluid medium 62. With respect to the stability of the PLL 68, it is noted that the amplifiers 82 and 84, the filter 86, and the low-pass filter 122, are sufficiently broad band to introduce substantially no phase shift to the signals on line 74. Also, the response time of the PLL 68, which is determined by the values of the aforementioned resistance and capacitance in the integrator 114, is substantially longer than the delay experienced by signals propagating through the fluid medium 62 so that this delay has no more than a negligible effect upon the loop stability of the PLL 68. (By response time, herein, is meant the time required for the PLL 68 to complete adjustment of the frequency of the VCO 118 in response to a step change in the phase difference between the signals on lines 108 and 112 such as would be induced by a sudden change in the speed of the fluid between the two transducers 46 and 48.)

The computation unit 70 of FIG. 5 includes a timer 125 which comprises a clock 126, a counter 128, a count detector 130, and a switch 132 which selectably connects parallel output lines 134 of the counter 128 with the parallel input lines 136 of the count detector 130. A control knob 138 located at a point of convenience, such as in the cabin of the ship 24 of FIG. 1, is mechanically connected to the switch 132 for selecting the desired ones of the lines 134. The clock 126 provides clock pulses on line 140 which are counted by the counter 128. The counter 128 comprises cascaded stages of modulo-2 counters for providing a binary number representing the count on the parallel output lines 134, with each of the lines 134 representing one digit of the binary number. In particular, the line 78 is connected with the counter output line 134 representing the digit for the number 8192 and therefore is energized with a square wave signal representing the transitions in the state of this digit.

The timer 125 further comprises a multivibrator 142 and a flip-flop 144. The multivibrator 142 is connected via line 146 to the counter output line 134 representing a count of 4096 and is triggered by the transition from a low voltage to a high voltage, that is, when a logical 1 appears on line 146. The flip-flop 144 is SET by a pulse signal on line 148 provided by the count detector 130. The multivibrator 142 is a "one-shot" or monostable multivibrator which provides a narrow pulse at its Q output on line 150 for resetting the flip-flop 144. The output of the timer 125 appears on line 152 as a pulse signal having a preselected pulse width.

The count detector 130 provides the aforesaid pulse signal on line 148 in response to the presence of a preselected binary number appearing on the lines 134. The count detector 130 is of well-known form and may comprise, for example, a multiple input AND gate (not shown in the figures) having the inputs preceded by digital inverters, the AND gate inputs as well as the digital inverter inputs being brought out on the lines 136. The AND gate provides its output pulse if, and only if, the proper sequence of high and low voltages appears on the respective ones of the lines 136, that is, if the preselected binary number is present on the lines 136. This preselected number is selected to have a value in the range of 0–4096, to delay the SETTING of flip-flop 144, the exact value depending on whether the display 32 reads in knots, feet/sec or other unit of speed, with the value of approximately 1000 being utilized in the preferred embodiment for reasons which will become apparent.

In the operation of the timer 125, therefore, when the count detector 130 detects the number selected by the selector switch 132, a pulse is sent along line 148 to SET the flip-flop 144. Later, when the counter 128 reaches a count of 4096, the signal on line 146 triggers the multivibrator 142 which in turn RESETS the flip-flop 144. The flip-flop 144 provides at its Q output the pulse on line 152 for AND gate 154, the leading edge of this pulse occurring at the time when the flip-flop 144 is set by the signal on line 148 and the trailing edge of the pulse on line 152 occurring when the flip-flop 144 is reset by the signal on line 150. Thus, it is seen that the pulse on line 152 begins when the count detector 130 detects the preselected number and terminates when the counter 128 reaches a count of 4096.

The computation unit 70 also comprises an UP-DOWN counter 156, a digital inverter 158 and multivibrators 160 and 162. The digital inverter 158 converts the low voltage representing a logic state of 0 to the high voltage representing a logic state of 1, and vice versa. The UP-DOWN counter 156 provides a binary-coded-decimal (BCD) output and counts clock pulses received on line 164 from the AND gate 154 in response to the conicidence of pulses 124 on line 76 and the pulse on line 152. Thus, the AND gate 154 passes the pulses 124 during the duration of the pulse on line 152. The counter 156 counts the pulses on line 164 by counting UP in response to the presence of a low voltage on line 166 from the digital inverter 158, or counts DOWN in repose to the presence of a low voltage on line 78. It should be noticed in this connection that line 78 interconnects the counter 128, the switch 88, the digital inverter 158, the multivibrator 160 (via a switch 216) and the "DOWN command" terminal of the counter 156.

The counter 156 is reset by the combined action of the multivibrators 160 and 162, both being "one-shot" or monostable multivibrators. This resetting occurs at a time delayed from the occurrence of the leading edge of a positive pulse on line 78, with the delay being provided by the multivibrator 162. Thus, in response to the leading edge of a positive pulse on line 78, the multivibrator 160 provides a narrow pulse on line 168 which in turn triggers the multivibrator 162 to provide a negative going pulse 170 at its Q output; the counter 156 resets on the positive slope or trailing edge of the pulse 170, this resetting occurring after a delay equal to the width of the pulse 170.

Figure 7:
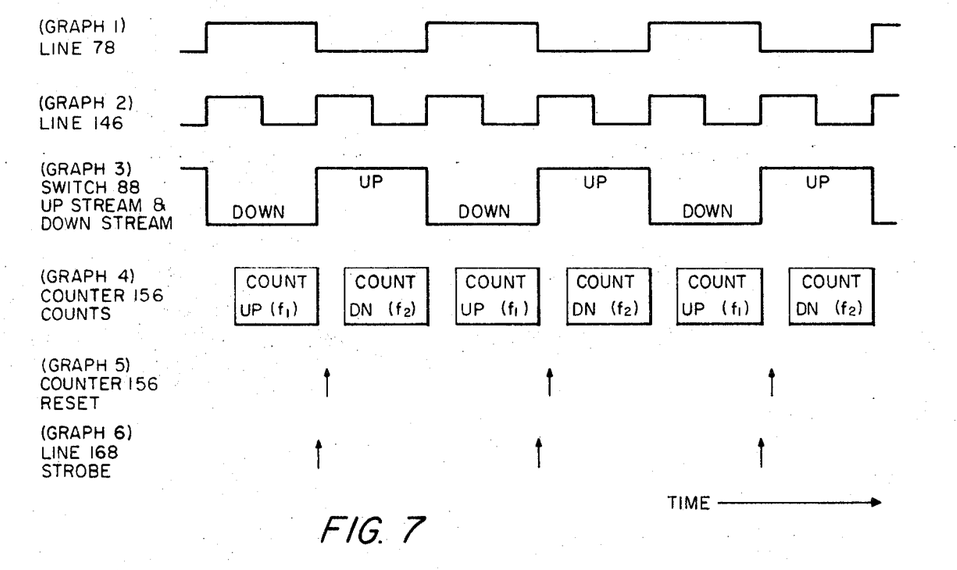
FIG. 7 is a timing diagram useful in the explanation of the system of FIG. 5.

The operation of the system 20 in FIG. 5 may be better understood with reference to the timing diagram of FIG. 7. The timing diagram shows six graphs which are respectively: (1) the waveform on line 78 showing the square wave resulting from transitions in the voltage level of the thirteenth digit (the number 8192) of the counter 128, (2) the waveform of the line 146 showing the square wave resulting from transitions in the voltage level of the twelfth digit (the number 4096) of the counter 128, (3) the positions of switch 88 which are alternately the upstream and downstream positions, (4) the counting intervals of the counter 156 which correspond to those intervals of time during which the pulse on line 152 is applied to the AND gate 154, (5) the times when the counter 156 is reset, and the final graph (6) showing the times when a numeric indicator (to be described hereinafter) of the display 32 is strobed.

With respect to the fourth graph, it is noted that the counter 156 starts to count clock pulses received on line 164 at times delayed from the switching of switch 88 in the third graph, this delay being equal to the time required for the counter 128 to reach the aforementioned preselected number to which the count detector 130 is present, and the counter 156 stops counting at the times of the resetting of flip-flop 144 which are the times of positive voltage transitions on line 146. The counter 156 counts UP or DOWN corresponding to the value of the voltage on line 78, this corresponding respectively to the downstream and upstream positions of the switch 88. Each counter reset signal in the fifth graph corresponds to the trailing edge of the pulse 170, as was mentioned hereinbefore, and occurs at a preset delay after the positive voltage transition of the signal on line 78 (Graph 1).

As already noted in the timing diagram of FIG. 7, the counter 156 counts UP during downstream transmissions of radiant energy and counts DOWN during upstream transmissions of radiant energy, these transmissions occurring at the frequencies $f_1$ and $f_2$. This is in accordance with the Equations 1–7 and in accordance with FIG. 3 wherein the frequency $f_1$ is transmitted in the downstream direction and the frequency $f_2$ is transmitted in the upstream direction. The delay between the inception of each counting interval of the counter 156 and the times when the switch 88 switches state provides adequate time for the PLL 68 of FIG. 5 to adjust the frequency of its VCO 118 in response to a switching between upstream and downstream transmissions to provide the integral number of wavelengths in the propagation of the sonic energy between the two transducers 46 and 48 at the aforementioned frequencies $f_1$ and $f_2$.

The delay in the resetting of the counter 156 after the termination of a count-down interval permits entry of the fluid speed data and the propagation speed data into the display 32 of FIG. 5 prior to the resetting of the counter 156. As seen in FIG. 5, the electrical cable 40 comprises line 168 which serves to strobe the display 32 for entry of numeric data in a manner to be described.

Returning to FIG. 5, the system 20 further comprises a complement unit 172 and a count detector 174, similar to the count detector 130, which are located within the computation unit 70, and a numeric indicator 176 and a flow direction indicator 178 which are located within the display 32. The operation of these units with the counter 156 is readily explained with reference to Equations 6 and 7. It is noted that the computation of the fluid velocity V involves the subtraction of $f_2$ from $f_1$, this resulting in a positive quantity if $f_1$ is transmitted in the downstream direction as seen in FIG. 3. In the event that the fluid velocity reverses direction, such as for example, if the ship 24 of FIG. 1 sails backwards, then the quantity $f_1 - f_2$ assumes a negative value. The numeric indicator 176 displays only the absolute value of the fluid velocity V while the flow direction indicator 178 indicates whether this fluid flow is in the forward or reverse direction. with respect to the propagation speed C, the sum of the frequencies $f_1 + f_2$ is obtained, in which case no negative quantity appears.

The UP-DOWN counter 156 is utilized in forming the difference $f_1 - f_2$ as well as the sum $f_1 + f_2$. To form the difference $f_1 - f_2$, the counter 156 first counts UP for a preselected interval of time thereby giving a count proportional to $f_1$. Similarly, when the counter 156 is counting DOWN, the total decrement in the count during the counting interval is proportional to $f_2$. To obtain $f_1 + f_2$, the counter 156 counts UP only.

With respect to the situation in which the ship 24 of FIG. 1 sails backwards, or in the event that the fluid in the sections of pipes 50A and 50B of FIG. 3 flows in the reverse direction, in which cases the value of $f_2$ is greater than the value of $f_1$, the decrement in the count of the counter 156 during a count DOWN interval exceeds the increment in the count of the counter 156 during a count UP interval. As a result, the resultant count of the counter 156 would be a very large number rather than the relatively small number which would be anticipated in the situation where the ship 24 of FIG. 1 sails backwards. This large number is converted to the desired relatively small number by means of the complement unit 172 which comprises a well-known circuit and, in response to an activating signal on line 180, provides on the parallel lines 182 the complement of the binary number appearing at the output of the counter 156 on the parallel lines 184. (That is, for each 0 appearing on an input line of the complement unit 172, a 1 appears on the corresponding output line, and vice versa.) In the absence of the actuating signal on line 180, the binary number appearing on the parallel lines 182 is equal to the binary number appearing on the parallel lines 184. The counter 156 has a sufficient number of stages to provide a maximum number which is much larger than that of any anticipated velocity, and the count detector 174 which is connected to the parallel lines 184 is set to provide the actuating signal on line 180 whenever it senses this maximum number. The signal on line 180 is also applied to the flow direction indicator 178 to indicate a forward or reverse flow of the fluid. The binary number appearing on the parallel line 182 is applied to the numeric indicator 176 to display the velocity measurement.

The numeric indicator 176 comprises a register of D latching flip-flops (not shown in the figures) which store the binary number of the parallel lines 182 upon command of the strobe signal on line 168, the times of occurrence of the strobe signal being seen in the sixth graph of FIG. 7. The numeric indicator 176 further comprises a digital numerical readout of well-known type, such as, a segmented numeral in which the appropriate segments are illuminated in response to a BCD number stored in the aforesaid register.

A switch 186 is provided for disconnecting the line 78 from the DOWN-command terminal of the counter 156 and for connecting the line 166 to a source 188 of low voltage (or ground), to make the counter 156 count UP only. In this mode the resultant speed indication presented on the numeric indicator 176 is the speed of propagation within the fluid medium 62.

Figure 6:
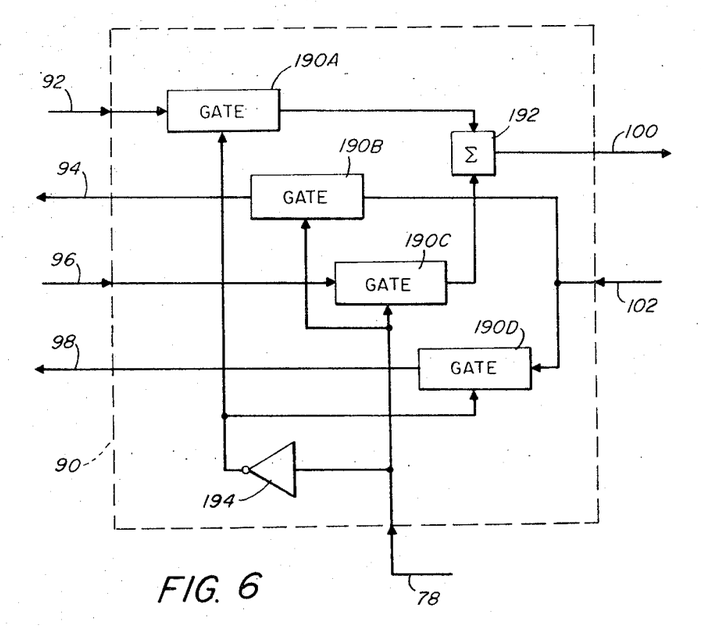
FIG. 6 is a gating unit which may be employed alternatively in the system of FIG. 5 in lieu of an interface switch thereof.

Referring momentarily to FIG. 6, the gating circuit 90 is now described. As has been mentioned hereinbefore, the gating circuit 90 may be utilized in place of the switch (or relay) 88 in the interface unit 66 of FIG. 5. The gating circuit 90 comprises four gates 190A–D for passing the analog signals on lines 92, 94, 96, and 98, a summing circuit 192 for connecting signals received on either line 92 or line 96 with line 100, and a digital inverter 194 for converting the low voltage portions of the square wave signal on line 78 to a high voltage for operating the gates 190A and 190D. Thus, in response to a high voltage on line 78, the gates 190B and 190C are activated to transmit a signal from line 102 via line 94 in the downstream direction, and to pass the received signal on line 96 to line 100. When a low voltage appears on line 78, the gates 190A and 190D are energized to provide for a signal transmission in the upstream direction through the fluid medium 62 of FIG. 5.

The BCD number provided by the counter 156 for the numeric indicator 176 will now be described in greater detail. This number represents the fluid medium speed V or the propagation speed C directly without any further scaling being required. All scaling is accomplished by the timer 125 in a manner which may be readily demonstrated by reference to the fluid speed V as given by Equation 6.

The computation represented by Equation 6 will now be demonstrated for the case of a simple example in which, for purposes of illustration, it will be presumed that a fluid speed V of 5 feet per second is to be measured with a transducer spacing $d$ of one foot, with the number of wavelengths, $n = 10$, being utilized. Substituting these values into Equation 6 provides for the difference frequency, $f_D = f_1 - f_2$, the value of 100Hz. Thus, under the conditions of this example, a difference frequency of 100Hz is associated with a fluid speed of five feet per second. To provide the numeral 5 on the numeric indicator 176, the counter 156 is required to count the pulses on line 164 for a selected interval of time in the UP direction and again for the same interval of time in the DOWN direction such that the number appearing on the parallel lines 182 is the binary-coded-decimal representation of the numeral 5.

The desired duration of the foregoing interval is established by noting that the pulses 124 have a repetition frequency which, as has been mentioned hereinbefore, is double the frequency of the transmitted radiant energy due to the division by 2 provided by the flip-flop 120, and therefore, if the counter 156 were permitted to count UP for one second, the total count accumulated during this one second would be equal to double the frequency $f_1$. Similarly, if the counter 156 were permitted to count DOWN during an interval of one second, the total decrement in the count would be equal to twice the value of the frequency $f_2$. The difference frequency $f_D$ would, in this example, be equal to 200Hz rather than 100Hz. Thus, it is seen that if the counting intervals are set for a duration of one second, a BCD representation of the numeral 200 appears on the parallel lines 182 while, in the present example, it is desired to have the numeral 5 appear on these parallel lines 182. It is readily apparent that if the timer 125 restricts the entry of pulses 124 through the AND gate 154 for a duration of 5/200 of a second during the count UP interval and also during the count DOWN interval, then the desired number 5 appears in the BCD format on the parallel lines 182. Should it be desirable to read the number displayed on the numeric indicator 176 to the nearest 1/10 of a foot per second, that is, the number 5.0 is to appear, then the timer 125 would be set to pass the pulses 124 through the AND gate 154 for a duration of time equal to 50/200 seconds, or equivalently, 250 milliseconds.

It is understood that in order to provide a counting interval of 250 milliseconds, it is necessary that the square wave signal on line 78 have a sufficiently low repetition frequency such that the switch 88 remains in a downstream or upstream position for a period of time sufficiently longer than this 250 millisecond interval to permit the PLL 68 to lock on to the downstream and upstream frequencies $f_1$ and $f_2$. With a clock frequency (clock 126) of approximately 20,000Hz, the aforementioned connection of line 78 to the particular one of the parallel lines 134 representing the count 8,192 provides a switching of the switch 88 every 200 milliseconds; use of the particular one of parallel lines 134 representing the count 16,384 provides a switching of the switch 88 every 400milliseconds. Thus, it is seen that a suitable connection can be made between the line 78 and the parallel lines 134 to provide a desired switching frequency to the switch 88.

With respect to the preceding example, should it be desirable to present the speed on the display 32 in units of knots rather than feet per second, the number appearing in the numeric indicator 176 must be scaled by multiplying by the factor 0.5925, that is, the number 2.3 is to appear in the numeric indicator 176 instead of the number 5.0. Switch 132 provides this scaling by setting the timer 125 to reduce the width of the pulse on line 152 by the factor 23/50, with the result that the counter 156 counts UP during an interval of 115 milliseconds and counts DOWN during an equal interval of time. Thus, it is seen, as demonstrated by the foregoing example, that the timer 125 cooperates with the counter 156 to serve as a scaler of the data presented by the numeric indicator 176 to provide this data with a desired unit of speed. It is also apparent that by suitably connecting the switch 132, the timer 125 can serve as a means for calibrating the system 20.

It is also apparent that if it is desired to accomplish the counting during a shorter interval of time, this can be accomplished by utilizing a voltage controlled oscillator providing double or quadruple the pulse repetition frequency of VCO 118 to the pulses 124 in combination with, respectively, a well-known divide by 4 or divide by 8 digital circuit in lieu of the divide by 2 function provided by the flip-flop 120.

In the preceding example, ten wavelengths of radiant energy were presumed in the propagation within the fluid medium 62 between the transducers 46 and 48. As a practical matter, in selecting the optimum number of wavelengths to be utilized in any particular situation, several considerations must be balanced against each other. First, it is noted that a greater number of wavelengths provides a greater accuracy of the measurement because the sensitivity of the system 20 to a change in propagation delay is correspondingly increased. Second, the number of wavelengths utilized should be small enough to permit the PLL 68 to lock on to the frequencies $f_1$ or $f_2$. It is readily apparent that phase lock can be obtained at any frequency for which an integral number of wavelengths is obtained between the transducers 46 and 48. This presents no problem for low speeds of fluid flow in which there is a sufficiently small change in frequency from zero speed to the speed at which the measurement is taking place such that an increment of only a fraction of a wavelength need be compensated for by the shift in frequency. However, where the speed to be measured is such that the increment in the number of wavelengths between the two transducers 46 and 48 is greater than a wavelength, then the PLL 68 might lock in at a frequency corresponding to an increment of only a fraction of a wavelength.

Furthermore, the number of wavelengths between the two transducers 46 and 48 depends on the speed of propagation within the fluid medium 62. Comparing the speed of propagation in a medium of water and in a medium of liquified natural gas, it is seen that these speeds are approximately 5,000 feet per second and 2,500 feet per second, respectively. In addition, the effects of temperature and pressure may account for speed variations by as much as 5 percent in water and 10 percent in liquified natural gas. To establish the desired number of wavelengths, these differences in propagation speed are to be accounted for either by varying the spacing between the transducers 46 and 48 or by varying the frequency of the radiant energy propagating between the transducers 46 and 48.

With respect to the preferred embodiment, it has been fount that a frequency of radiant energy of 100KHz is a suitable frequency (at zero speed of the medium 62) for transmission of sonic energy in water, while a frequency of approximately 15KHz is a suitable frequency for transmission of sonic energy in a medium of liquified natural gas, with transducer spacings in both instances of nine inches. This provides twelve wavelengths and three wavelengths, respectively, in the water and liquified natural gas media. In the case of the water measurement, sixteen wavelengths is the maximum number of wavelengths for which the phase locked loop 68 will lock on to the proper frequency at a water speed of up to ten knots, but twelve wavelengths has been utilized to ensure reliable lock-on. In the case of the liquified natural gas, six wavelengths is the maximum contemplated for a speed of approximately ten knots, but only three wavelengths are utilized to ensure reliable lock-on of the PLL 68. The propagation delay time between the two transducers spaced at nine-inch spacing is approximately 100 microseconds in the case of water and 200 microseconds in the case of the liquified natural gas.

With respect to the preferred embodiment, a data rate of 2.5 measurements per second is accomplished, there being a 400 millisecond interval provided for one measurement of speed, while a 200 millisecond interval is provided for each upstream measurement of $f_1$ and similarly for each downstream measurement of $f_2$. The 200 millisecond interval includes an interval of approximately 50 milliseconds during which time the PLL 68 locks on to either the upstream or the downstream frequency and an interval of approximately 150 milliseconds during which time the counter 156 counts UP or DOWN. The clock 126 operates at a frequency of 20 KHz with an accuracy of 0.005 percent; this is sufficient to ensure adequate equality of the durations of the counting UP and counting DOWN intervals so that the difference between the two frequencies $f_1$ and $f_2$ is accurately obtained.

There is also shown in FIG. 5 a switch 216 for disconnecting the multivibrator 160 from the line 78 and reconnecting it with a line 218 or a line 220 which are connected respectively to the particular ones of the parallel lines 134 representing the numbers 16,384 and 32,768 so that the counter 156 is not SET once per cycle of the switch 88 but rather is SET, either every second cycle of the switch 88, or upon every third cycle of the switch 88 thereby providing a longer averaging time over which the difference frequency, or the speed V of the fluid medium, is provided. In a similar manner, it is apparent that additional lines may be connected by the switch 216 to still higher stages of the counter 128 to provide averaging over intervals of every four or five cycles of the switching of switch 88. Recalling that the numeric indicator 176 is updated only upon application of the strobe signal on line 168, it is seen that the numeric indicator 176 is updated over intervals of every one, two or three cycles of the switching of switch 88, this corresponding to the RESETTING of the counter 156.

With respect to the measurement of the speed of propagation of sound within liquified natural gas, it is interesting to note that this speed varies in accordance with the composition of the gas and thus may be utilized as an indication of the heating capabilities of the gas. When the system 20 is used in such an application, the numbers appearing on the display 32 may be calibrated to read in therms, or other unit of heat.

Figure 8:
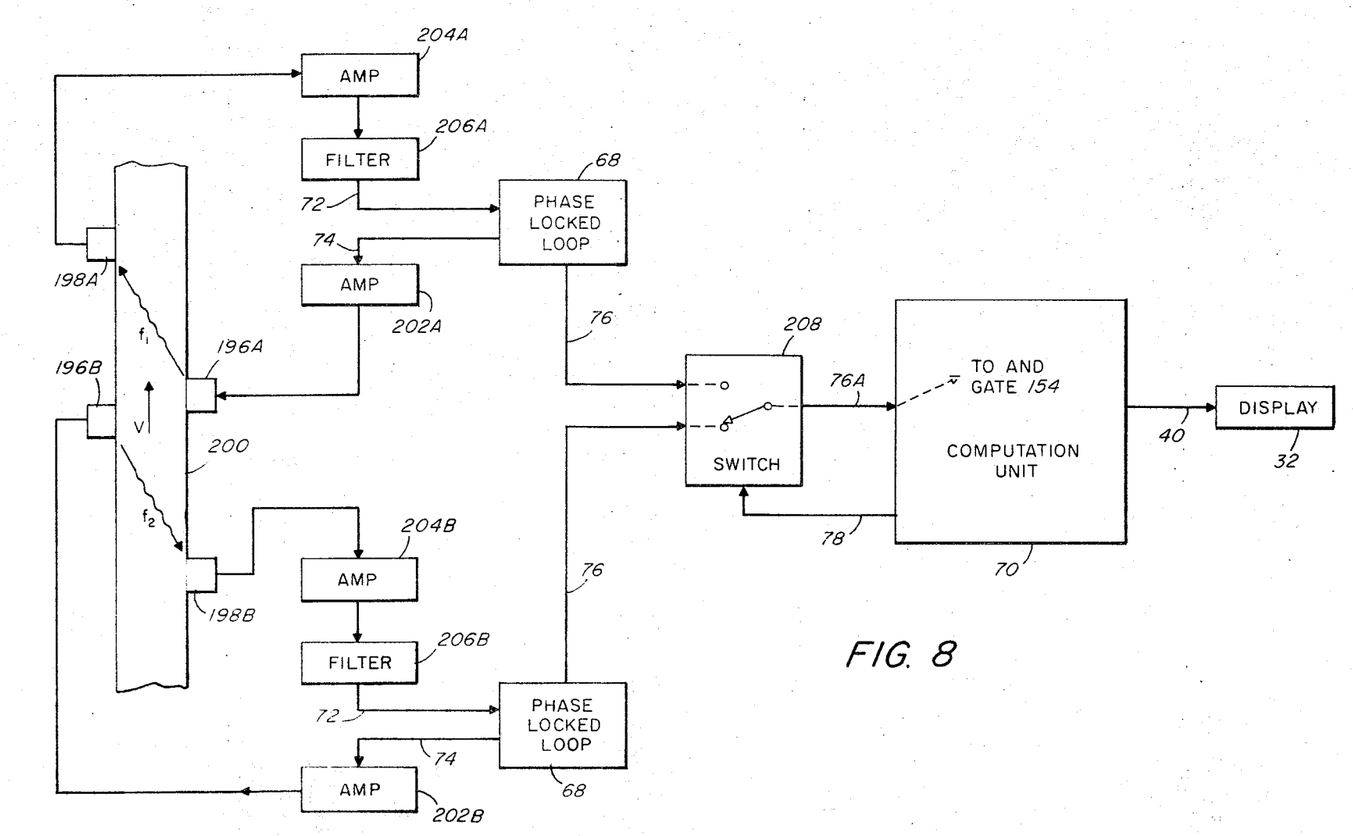
FIG. 8 is an alternative embodiment of the invention shown in block diagram form.

Referring now to FIG. 8, there is shown an alternative embodiment of the invention which utilizes two of the phase locked loops 68 in circuit with two pairs of transducers, namely, the transducers 196A and 198A, and the transducers 196B and 198B. The transducers 196A and 198A are utilized in propagating sonic energy at a frequency $f_1$ downstream through fluid moving with a velocity V in a pipe 200. Similarly, the transducers 196B and 198B are utilized for an upstream transmission of sonic energy in the pipe 200 at the frequency $f_2$. The signals are coupled from the phase locked loops 68 via amplifiers 202A–B to the transducers 196A–B with the amplifiers 202A–B functioning in a manner analogous to that of amplifier 84 of FIG. 5. The signals received by the transducers 198A and 198B are coupled via amplifiers 204A–B and filters 206A–B and the lines 72 to the phase locked loop 68, the amplifiers 204A–B and filters 206A–B functioning in a manner analogous to that of the amplifier 82 and filter 86 of FIG. 5. The lines 72, 74, 76, and 78 appear in both FIGS. 5 and 8. A switch 208 analogous to switch 88 of FIG. 5 is utilized to apply alternately the outputs of the two phase locked loops 68 to the computation unit 70 via line 76A. The computation unit provides a control signal for the switch 208 along line 78, in the same manner as that applied to switch 88 of FIG. 5, and also transmits numeric speed data along electrical cable 40 to the display 32 as was shown in FIG. 5.

In the system of FIG. 8, each phase locked loop 68 operates continuously, one loop operating at the frequency $f_1$ and the other loop operating at the frequency $f_2$. This is distinguishable from the operation of the phase locked loop 68 of FIG. 5 in that there the loop locks in at the downstream frequency $f_1$ for an interval of time after which it must acquire and track the upstream frequency $f_2$. The signal on line 76A of FIG. 8 is substantially the same as that on line 76 of FIG. 5 in that pulse trains having pulse repetition frequencies corresponding alternately to twice $f_1$ and twice $f_2$ appear on line 76A. It should be noted that in the embodiment of FIG. 8, the switch 208 may be operated more often that that of switch 88 of FIG. 5 providing shorter counting intervals for the counter 156 of the computation unit 70 since, in the embodiment of FIG. 5, the intervals between operations of the switch 88 must be sufficiently long to allow the PLL 68 time to reacquire the upstream and downstream frequencies. No such restriction is placed upon embodiment of FIG. 8 since each phase locked loop 68 operates continuously at one frequency.

Figure 9:
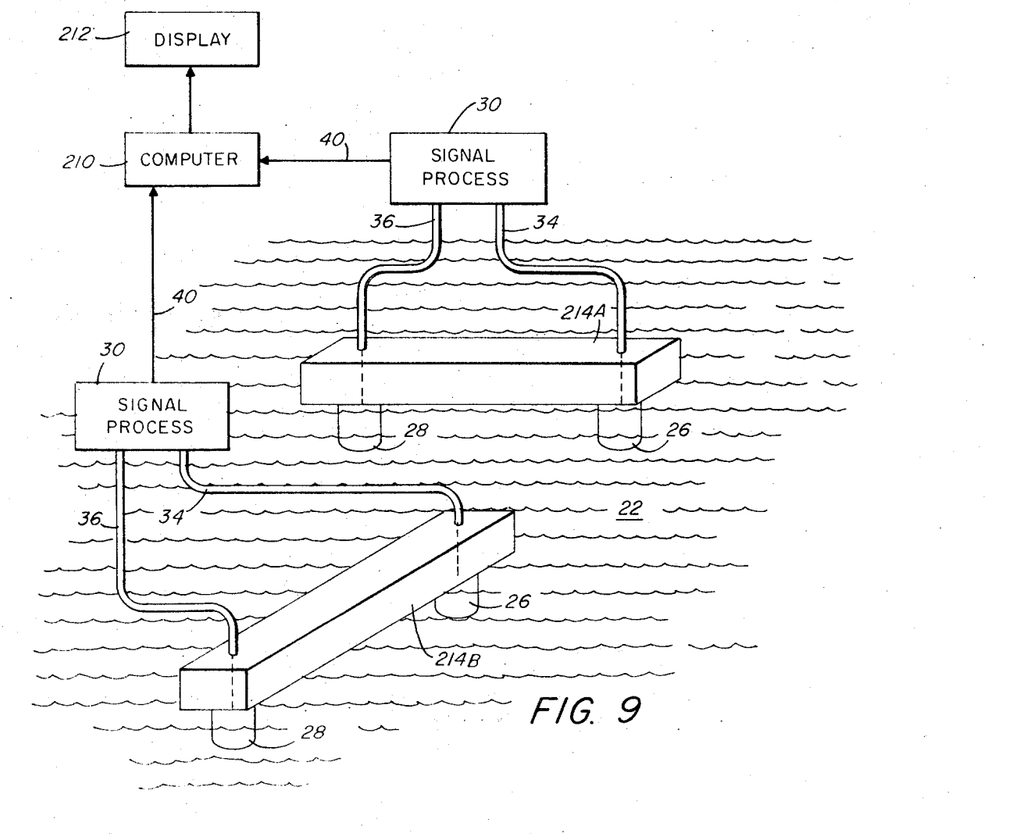
FIG. 9 is a system employing a pair of systems of FIG. 5 wherein the transducers are mounted in perpendicular directions for measuring the fluid velocity.

Referring now to FIG. 9, there is shown a system utilizing a pair of measurement systems, each of which comprises the portions of the system 20 of FIG. 1 minus the display 32, in which each signal processor 30 is connected via cable 40 to a computer 210 which calculates the velocity, namely, both speed and direction of the fluid, such as the water of the ocean 22, and presents this velocity on a display 212. Each pair of transducer assemblies 26 and 28 are mounted on frames 214A–B, which are oriented in perpendicular directions and support the transducer assemblies 26 and 28 submerged within the ocean 22. The speed data presented on any one of the electrical cables 40 represents the component of the velocity sensed by the corresponding signal processor 30 with the result that the computer 210 is provided with two perpendicular components of the fluid velocity along the two electrical cables 40. The velocity is then calculated by means of well-known tehniques whereby the resultant mangitude of the vectorial combination, as well as the direction of this resultant are presented on the display 212.

As an alternative method of computing both the magnitude and direction of the velocity vector, a single measurement system 20 of FIG. 1 may be utilized in which the transducer assemblies 26 and 28 are mounted on a frame, such as the frame 214A, and then means (not shown in the figures) are provided for rotating the frame about a vertical axis. The direction of the velocity vector is then that direction for which a display, such as the display 32 of FIG. 1, shows a maximum speed.

Figure 10:
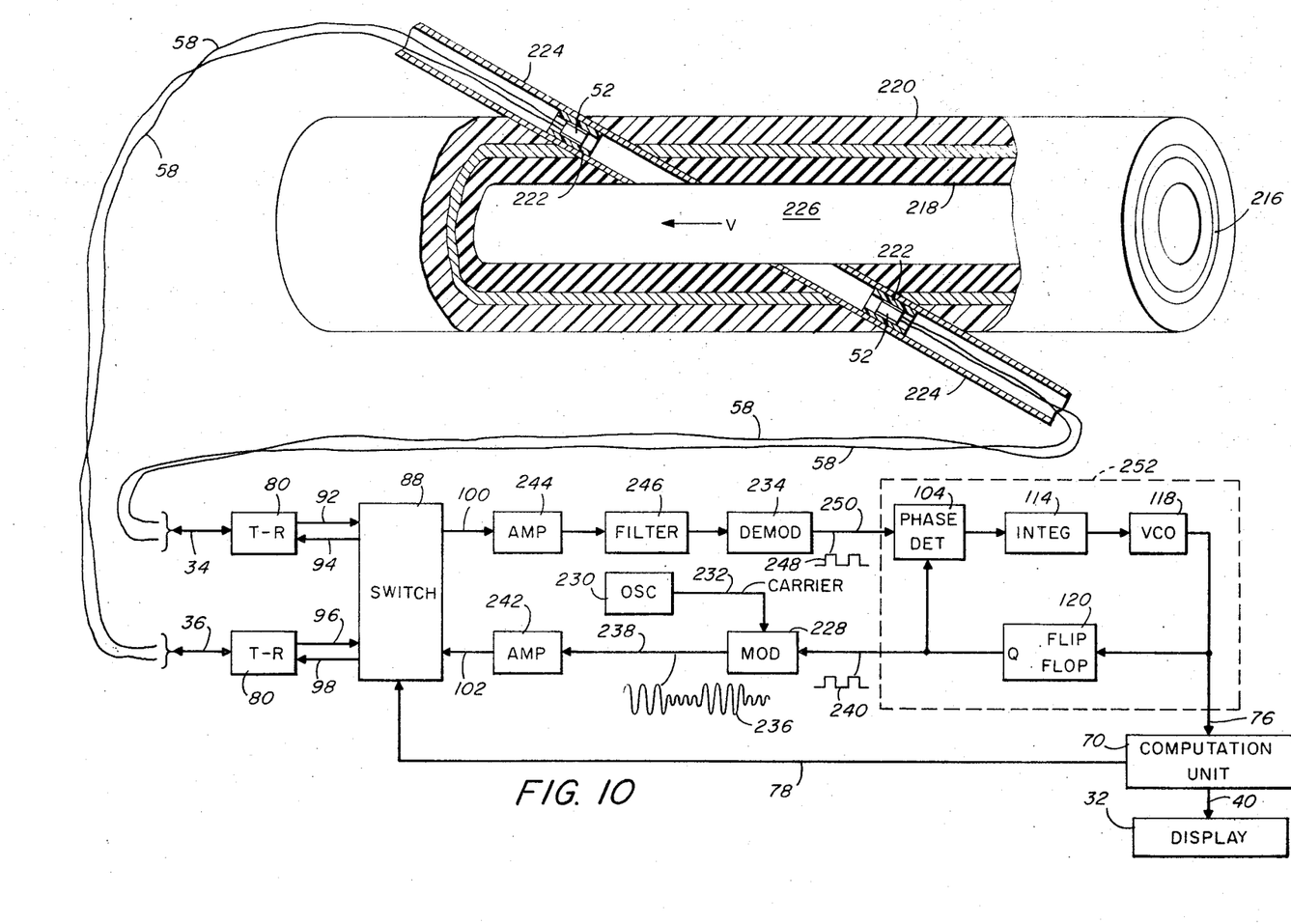
FIG. 10 shows a carrier modulated embodiment of the invention.

Referring now to FIG. 10, there is shown an alternative embodiment of the invention in which the speed measurement system of FIGS. 3, 4 and 5 have been modified to provide insulation within and outside the pipe section 50A of FIG. 3, and to provide for carrier modulated signals on the electrical cables 34 and 36 of FIGS. 4 and 5. Accordingly, there is provided a pipe 216, seen in a partially sectioned view, which is typically of a metal and is coated on its interior surface with an insulation material 218 and on its exterior surface with an insulation material 220. The interior and exterior layers of insulation material 218 and 220 absorb sonic energy which is transmitted by the transducers 52 and reflects off the interior walls of the pipes 216, thereby reducing the effects of reverberation of the sonic energy within the pipe 216. The transducers 52 are mounted within insulating pads 222, which serve to support the transducers 52 within tubular housings 224 to permit the transducers 52 to impart sonic energy into the fluid medium 226 while sonically insulating the transducers 52 from the housing 224. The inner insulation material 218 is made preferably from a rubber material having air pockets therein such as the commercially available product known as "SAPER-T" made by B. F. Goodrich. The outer insulation material 220 may be a layer of sand or an epoxy having air pockets therein as well as a brass powder therein to provide a sound absorbing medium which also serves as an acoustic impedance match between the pipe 216 and its external environment. Each of the layers of insulation material 218 and 220 may be utilized independently of the other or in combination as shown in FIG. 10. The thicknesses of the insulation materials 218 and 220 are selected in accordance with the frequency of sonic energy propagating between the transducers 52 and in accordance with well-known principles of acoustic impedance matching to reduce the amount of reverberation within the pipe 216 and therefore provide a more accurate measurement of the speed V of the fluid medium 226. As a matter of practice in the building of the invention, the interior layer of insulation material 218 is utilized only with relatively low speeds of the fluid medium 226, while the exterior layer of insulation material 220 is utilized for high rates of speed of the fluid medium 226.

Continuing with FIG. 10, it is seen that the system of FIG. 5 is modified by providing a carrier modulated with the signal of the Q output of the flip-flop 120, this modulation being provided by a modulator 228, an oscillator 230 providing a carrier to the modulator 228 along line 232, and a demodulator 234. The modulator 228 is of a well-known form and may provide, for example, an amplitude modulation of the carrier as shown by the signal waveform 236 on line 238. The envelope of the signal waveform 236 is an accurate duplication of the signal waveform 240 provided by the flip-flop 120. The signal on line 238 is then transmitted via amplifier 242, the switch 88, through a T-R 80, the fluid medium 226, the second T-R 80 and the switch 88 to appear on line 100 in the same manner as that described earlier with reference to FIG. 5. The amplifier 242 provides sufficient power to the signal on line 238 for transmission through the fluid medium 226, and an amplifier 244 and filter 246 couple the signal on line 100 to the demodulator 234. The amplifier 244 amplifies a signal on line 100 to a suitable value for processing by the demodulator 234, and the filter 246 has a band-pass characteristic sufficiently broad to pass the modulated carrier signal on line 100 while suppressing noise spectral components lying outside the signal bandwidth of the signal on line 100. The demodulator 234 is of well-known design and provides the inverse function of the modulator 228, namely retrieving the modulating waveform from the signal waveform 236, this retrieved waveform being identified in the figure by the numeral 248 and being transmitted along line 250 to the signal input port of the phase detector 104. The two waveforms 240 and 248 are substantially identical and correspond to the two square wave signals of FIG. 5 on respectively lines 112 and 108. The phase locked loop (PLL) 252 comprising simply the phase detector 104, the integrator 114, the VCO 118 and the flip-flop 120 function in the same manner as does the PLL 68 of FIG. 5 with respect to the square wave signals incident upon the phase detector 104. The output of the PLL 252 is provided along line 76 to the computation unit 70 in the same manner as the output of the PLL 68 is provided along line 76 to the computation unit 70.

In building the embodiment of the invention as shown in FIG. 10, a carrier frequency of 2 megahertz (MHz) has been utilized with a square wave modulation having a 50 kilohertz repetition frequency. Accordingly, the radiant energy signal transmitted by the transducers 52 has a carrier frequency of 2 MHz which results in a highly directive beam of radiant energy emanating from each of the transducers 52. In addition, the tubular housings 224 are oriented so that the beam of radiation from the transducer 52 in one of the housings 224 is directed towards the transducer 52 in the other tubular housing 224. The tubular housings 224 are sufficiently wide to accommodate a shifting in the position of the beam of incident radiation due to the motion of the fluid medium 226. Thus it is seen that by utilizing a highly directive beam of radiant energy, this beam can be directed from one transducer 52 to the other transducer 52 without intermediate reflections upon the walls of the pipes 216. Any secondary reflections, such as those produced by sidelobes in the directivity path of the radiant energy, are absorbed by the layers of insulation material 218 and 220. Furthermore, the unwanted reverberations are inhibited by virtue of the relatively high attentuations of the sonic energy at the carrier frequency of 2 MHz where the fluid medium 226 is water; thus multiple path reflections or reverberations are attenuated to a far greater extent than the direct transmission of the beam of radiant energy between the two transducers 52. The embodiment of FIG. 10 also provides the advantage that the transducers 52 may have the same size for any size of the pipe 216. This reduction in the strength of multipath reflections and reverberations ensures that such reverberations do not contribute any significant phase shift to the signal received by the transducer 52 so that the PLL 252 in conjunction with the computation unit 70 is able to provide accurate data with respect to the speed of the fluid medium 226.

It is understood that the above-described embodiments of the invention are illustrative only and that modifications thereof will occur to those skilled in the art. Accordingly, it is desired that this invention is not to be limited to the embodiments disclosed herein but it is to be limited only as defined by the appended claims.

What is claimed is:

1. A system of acoustic transducers arranged along a path of flowing fluid for measuring the speed of said fluid and the speed of sonic energy propagation within said fluid, said system comprising:

first means including a plurality of transducer assemblies immersed in said fluid for transmitting a first sinusoidal acoustic signal a predetermined distance through said fluid, one of said transducer assemblies being positioned for receiving said signal at the termination of said distance;

second means coupled to said first means for transmitting and receiving a second acoustic signal through said fluid in a direction reverse to said first signal transmission, said second means including means for maintaining a difference in phase between a point of entry into the fluid and a point of reception of said second signal equal to the difference in phase between the point of entry into the fluid and the point of reception of said first signal;

means for guiding said fluid past said transducer assemblies; and means responsive to the frequency of said first signal and the frequency of said second signal for providing selectively the speed of movement of said fluid and the speed of propagation of acoustic energy within said fluid, said speed providing means including timing means synchronized to said transmissions of said acoustic signal in said first direction and to said acoustic signal in said reverse direction for providing timing signals, and means for alternately counting cycles of said first and said second acoustic signals in response to said timing signals, the output of said counting means at the termination of said counting being proportional to a speed measurement.

2. In combination:

means for generating a plurality of first signals;

means coupled to a medium for transmitting said plurality of first signals for a predetermined distance in a plurality of directions within said medium;

means interconnecting said signal generator means and said transmitting means for switchably coupling each of said plurality of first signals with said transmitting means, said signal generating means adjusting the frequencies of respective ones of said plurality of first signals to provide equal phase differences between their points of entry into said medium and said points of exit from said medium;

means coupled to said switchable coupling means and said signal generator means for computing a speed of movement of said medium relative to said transmitting means and a speed of propagation of said radiant energy within said medium;

said signal generator means comprising means for detecting said phase differences, an oscillator connecting with said phase detector means for generating a succession of second signals having frequencies related to said phase differences, and means for dividing the frequency of said oscillator to provide the frequencies of said first signals; and said computation means comprising a clock for periodically operating said switching means, and means for counting cycles of said second signal, said counter incrementing the count in response to one position of said switching means and decrementing the count in response to a second position of said switching means to provide said speed of movement of the medium relative to said transmission means.

3. The combination according to claim 2 wherein said counting is accomplished during an interval having a preset duration provided by said clock.

4. The combination according to claim 3 wherein said computation means further comprises switching means for alternatively selecting a second incrementing count in place of said decrementing count to provide said speed of propagation of said radiant energy within said medium.

5. The combination according to claim 4 further comprising a display coupled to said computation means, said counting intervals being adjusted to provide a scaling of said computations for presentation upon said display.

6. A system for measuring the velocity of a medium comprising:

first means for transmitting radiant energy within said medium along a line a predetermined distance in one direction and in a direction reverse thereto;

second means for transmitting radiant energy within said medium along a second line perpendicular to said first line a predetermined distance in one direction and in a direction reverse thereto;

means coupled to said first transmission means and said second transmission means for generating the signals transmitted by said first transmitting means and said second transmitting means, said generating means adjusting said signals to provide equal phase length to said radiant energy signals transmitted along said first line and to said radiant energy signals transmitted along said second line;

computation means coupled to said generation means for computing numerical quantities proportional to the sums and differences of the frequencies of said radiant energy signals transmitted along said first line and said radiant energy signals transmitted along said second line; and computer means coupled to said computation means for vectorially combining said numerical quantities to provide the velocity of said medium relative to said first transmitter means and said second transmitter means.

7. In combination:

means for generating a signal;

a first transducer and a second transducer capable of converting said generated signal into a radiant energy signal, each of said transducers being positioned in a fluid medium for transmitting said radiant energy signal from one of said transducers to the other of said transducers;

switching means connected between said transducers and said generating means for coupling said generated signal alternately to said first transducer and said second transducer;

said generating means comprising a phase detector coupled to said switching means for receiving a signal from one of said transducers and a variable frequency oscillator providing an output signal in response to an output signal of said phase detector, an output signal of said oscillator being coupled to an input of said phase detector; and means coupled to said switching means and to an output of said oscillator for extracting speed information from the frequency of the output signal of said oscillator, said extracting means comprising a counter for counting cycles of said output means and coupled to said counter for providing a sequence of positive and negative countings in accordance with the direction of transmission of said radiant energy signals.

8. A combination according to claim 7 wherein said sequence providing means comprises a source of square wave signals, one of said square wave signals being coupled to said switching means for operating said switching means, said one square wave signal being coupled to one of the terminals of said counter and being coupled via an inverter to a second of said terminals, said terminals providing commands to said counter for counting upwardly and downwardly.

9. A combination according to claim 8 wherein said sequence providing means includes a gating circuit coupled to a second of said square waves and to an input of said counter, and means coupled to said square wave source for detecting a selected point in time, said gating circuit comprising means coupled to said detector and to said second square wave for gating the output of said oscillator.

10. A combination according to claim 9 wherein said gating means passes sequences of pulses from said oscillator to said counter.

11. A combination according to claim 10 wherein said sequence providing means comprises means coupled to an output of said counter for detecting the presence of a count which indicates a negative flow of said fluid medium relative to said transducers, and means coupled to said second negative flow detector for indicating said direction of flow.

12. A combination according to claim 11 further comprising a complementing circuit coupled to said output of said counter and coupled to an output of said negative flow detector for complementing the output of said counter during said negative flow of said fluid medium.

* * * * *

UNITED STATES PATENT OFFICE
CERTIFICATE OF CORRECTION

Patent No. 3,751,987                Dated August 14, 1973

Inventor(s) Brian Edward Whitmore

It is certified that error appears in the above-identified patent and that said Letters Patent are hereby corrected as shown below:

On the cover sheet insert -- [73] Assignee: Carl Schenck Maschinenfabrik GmbH --.

Signed and sealed this 8th day of January 1974.

(SEAL)
Attest:

EDWARD M. FLETCHER, JR.          RENE D. TEGTMEYER
Attesting Officer                 Acting Commissioner of Patents